(12) United States Patent
Roberts

(10) Patent No.: US 12,228,160 B2
(45) Date of Patent: Feb. 18, 2025

(54) TWO-PIECE THREADED FASTENER ASSEMBLY

(71) Applicant: Tite-Spot, LLC, Cincinnati, OH (US)

(72) Inventor: Craig A. Roberts, Cincinnati, OH (US)

(73) Assignee: Tite-Spot, LLC, Cincinnati, OH (US)

( * ) Notice: Subject to any disclaimer, the term of this patent is extended or adjusted under 35 U.S.C. 154(b) by 152 days.

(21) Appl. No.: 17/825,003

(22) Filed: May 26, 2022

(65) Prior Publication Data

US 2022/0381283 A1  Dec. 1, 2022

Related U.S. Application Data

(60) Provisional application No. 63/193,596, filed on May 26, 2021.

(51) Int. Cl.
*F16B 33/02*  (2006.01)

(52) U.S. Cl.
CPC .................................. *F16B 33/02* (2013.01)

(58) Field of Classification Search
CPC ........ F16B 5/0283; F16B 23/00; F16B 25/00; F16B 31/021; F16B 33/00; F16B 33/02; F16B 35/00; F16B 35/041; F16B 35/06; F16B 37/14
USPC .......... 411/372.5–372.6, 373–374, 383, 396, 411/397, 411, 424, 429, 432
See application file for complete search history.

(56) References Cited

U.S. PATENT DOCUMENTS

| | | | |
|---|---|---|---|
| 2,107,925 A | 2/1938 | Ash | |
| 3,468,211 A * | 9/1969 | Suan | F16B 39/06 411/397 |
| 3,517,402 A * | 6/1970 | Cohen | F16B 4/006 470/2 |
| 3,611,862 A | 10/1971 | Walker et al. | |
| 3,832,747 A * | 9/1974 | Nankivell, Jr. | B21K 1/44 470/5 |
| 4,681,496 A | 7/1987 | Fasolino | |
| 4,729,707 A | 3/1988 | Takahashi | |
| 4,848,405 A | 7/1989 | Albrecht | |
| 5,226,770 A | 7/1993 | Watson | |
| 5,395,196 A * | 3/1995 | Notaro | F16B 35/00 411/396 |
| 5,645,386 A | 7/1997 | Damm et al. | |
| 6,575,536 B2 | 6/2003 | Chen | |
| 6,997,660 B2 * | 2/2006 | Fedor | B63H 21/10 411/383 |
| 8,109,706 B2 * | 2/2012 | Richards | F16B 35/044 411/378 |
| 9,422,967 B2 | 8/2016 | Koenig et al. | |
| 11,852,183 B2 * | 12/2023 | Kim | F16B 37/04 |

(Continued)

FOREIGN PATENT DOCUMENTS

JP          2016121800 A  *  7/2016  .............. F16B 23/00

*Primary Examiner* — Roberta S Delisle
(74) *Attorney, Agent, or Firm* — Porter Wright Morris & Arthur LLP

(57) ABSTRACT

A threaded fastener assembly for use with a nut includes a shaft head and a separate shaft. The shaft head includes a head, and an internally-threaded portion. The shaft has a first externally-threaded portion for cooperation with the internally-threaded portion of the shaft head to selectively secure the shaft to the shaft head, a second externally-threaded portion for cooperation with the nut, and an integrated nut or wrenching portion for tightening the shaft to the shaft head.

20 Claims, 7 Drawing Sheets

(56) References Cited

U.S. PATENT DOCUMENTS

2014/0243110 A1    8/2014   Cackett et al.
2015/0369272 A1   12/2015   Hohmann, Jr.
2016/0208840 A1    7/2016   Neber

* cited by examiner

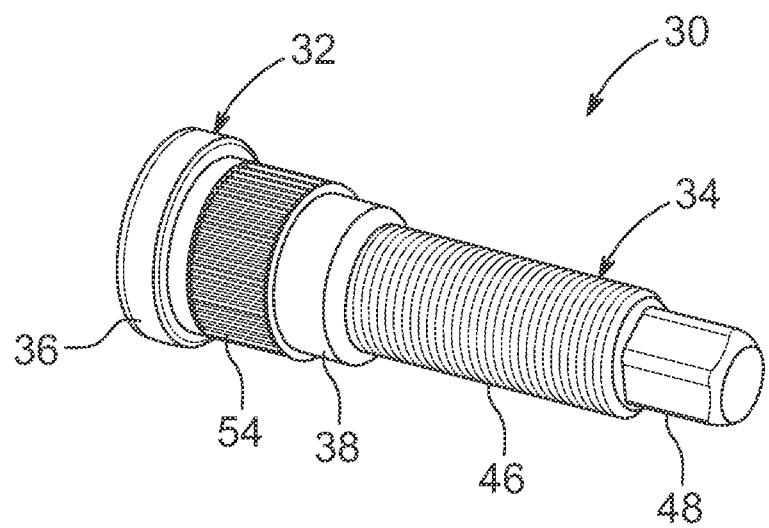
FIG. 5
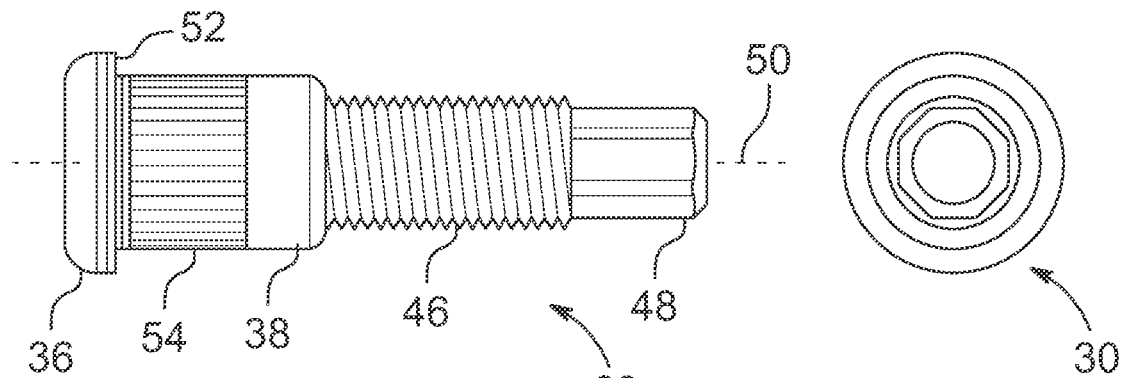
FIG. 6
FIG. 7
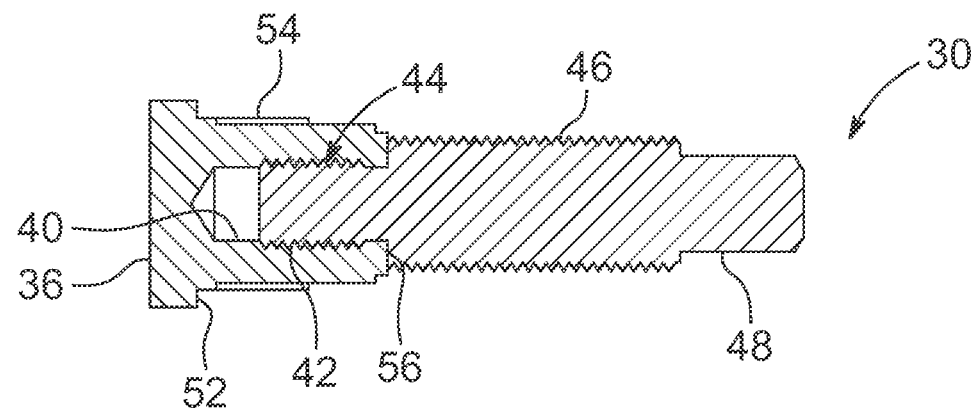
FIG. 8

TWO-PIECE THREADED FASTENER ASSEMBLY

CROSS-REFERENCE TO RELATED APPLICATIONS

This application claims the priority benefit of U.S. provisional patent application No. 63/193,595 filed May 26, 2021, the disclosure of which is expressly incorporated herein in its entirety by reference.

STATEMENT REGARDING FEDERALLY SPONSORED RESEARCH

Not applicable

PARTIES TO A JOINT RESEARCH AGREEMENT

Not Applicable

REFERENCE TO APPENDIX

Not applicable

FIELD OF THE INVENTION

The field of the present invention generally relates to threaded fasteners such as bolts used to fasten two work pieces together and, more particularly, to such threaded fasteners for use where a space behind one of the work pieces is smaller than a length of the fastener.

BACKGROUND OF THE INVENTION

In many motor vehicles, lug bolts or studs are utilized along with lug nuts to secure wheels to wheel hubs. The lug bolts extend from a rear of the wheel hub through openings in the wheel hub, and then through holes in the wheel where the lug nuts are secured to the outer free ends of the lug bolts to tightly secure the two surfaces together so that the wheel rotates with the hub.

Often one or more of the lug bolts or studs is damaged or even broken and must be replaced. The damage is most commonly caused by over torqueing or cross threading. Prior art replacement wheel studs are readily available (best shown in FIGS. 1 to 4) so that the damaged lug bolts can be replaced. The illustrated one-piece prior art replacement wheel stud 10 includes a fixing segment 12 for cooperation with the wheel hub 14 and a receiving segment 16 for cooperation with the lug nut 18. At a free end of the fixing segment, the wheel stud 10 includes a head 20, which is widened in the manner of a flange that is larger than the opening in the wheel hub 14. The illustrated fixing segment also includes a spline having serrations or teeth running parallel to the wheel stud's longitudinal axis, that is against the direction of rotation. The illustrated receiving segment 16 includes an external thread sized and shaped to cooperate with the conventional lug nut 18.

Conventionally, the wheel stud 10 is first pushed or pressed in the direction from inside of the vehicle to the outside of the vehicle, so that receiving segment 16 enters the closely-sized opening or bore in the wheel hub 14. The wheel stud 10 is further pushed until the head 20 abuts against the inner surface of the wheel hub 14. The head thus acts as a counter bearing mechanism and limits the travel of the wheel stud 10 through the wheel hub 14. The wheel stud 10 is connected to the wheel hub 14 securely, at least partly through the action of the spline within the opening. Moreover, the spline limits twisting, rotation, and movement of the wheel stud 10 within the opening of the wheel hub 14. Fixed in this manner, the wheel stud 10 serves as a mounting aid when assembling a wheel 22 to the wheel hub 14. The lug nut 18 can be screwed onto the external thread of the receiving segment 16, to guide and attach a wheel 22 to the wheel hub 14.

In order to insert the wheel stud 10 into the wheel hub opening, however, there must be an adequate amount of space 23 at the inner side of the wheel hub 14 which corresponds to at least the length of the wheel stud 10. For some models of motor vehicles, there is not enough space 23 behind the wheel hub 14 to insert the replacement wheel stud 10 through the hole in the wheel hub 14 because the space 23 behind the wheel hub 14 is smaller than the length of the wheel stud 10. As a result, the wheel hub 14 and/or surrounding components 24 must be removed. This causes additional work and risk of damage.

Accordingly, there is a need for improved threaded fasteners such as, for example but not limited to, lug bolts that can be installed in restricted spaces smaller than the length of the threaded fasteners.

SUMMARY OF THE INVENTION

The present invention provides threaded fastener assemblies such as lug bolts or other bolts for installation in restricted spaces smaller than the length of the threaded fastener assemblies. Disclosed herein is a threaded fastener assembly for use with a nut that comprises, in combination, a shaft head or first piece, and a separate shaft or second piece. The shaft head includes a head. The shaft includes a first externally-threaded portion for cooperation with the internally-threaded portion of the shaft head to selectively secure the shaft to the shaft head, and a second externally-threaded portion for cooperation with the nut.

Also disclosed herein is threaded fastener assembly for use with a nut that comprises, in combination, a shaft head or first piece and a separate shaft or second piece. The shaft head includes a head, and a fixing segment extending from the head. At least a portion of the fixing segment includes an internally-threaded portion. The shaft head also includes a spline on an external surface of the fixing segment. The shaft includes a first externally-threaded portion for cooperation with the internally-threaded portion of the shaft head to selectively secure the shaft to the shaft head, a second externally-threaded portion for cooperation with the nut, and an integrated nut portion for tightening the first externally-threaded portion of the shaft with the internally-threaded portion of the first piece.

Further disclosed is a threaded fastener assembly for use with a nut and comprising, in combination, shaft head or first piece and a separate shaft or second piece. The shaft head includes a head, and a fixing segment extending from the head. At least a portion of the fixing segment includes an internally-threaded portion. The shaft head includes a spline on an external surface of the fixing segment. The shaft includes a first externally-threaded portion for cooperation with the internally-threaded portion of the shaft head to selectively secure the shaft to the shaft head, a second externally-threaded portion for cooperation with the nut, and an integrated nut portion for tightening the first externally-threaded portion with the internally-threaded portion of the shaft head. The first externally-threaded portion and the second externally-threaded portion are continuous of the shaft are continuous. An end of the shaft engages an abutment formed within the shaft head.

From the foregoing disclosure and the following more detailed description of various preferred embodiments it will be apparent to those skilled in the art that the present invention provides a significant advance in the technology and art of threaded fasteners such as bolts. Particularly, significant in this regard is the potential the invention affords for enabling threaded fasteners to be installed in restricted spaces smaller than the length of the threaded fasteners. Additional features and advantages of the invention will be better understood in view of the detailed description provided below.

BRIEF DESCRIPTION OF THE DRAWINGS

These and further objects of the invention will become apparent from the following detailed description.

FIG. 5 shows a perspective view of two-piece lug bolt assembly according to a first embodiment of the present invention.

FIG. 6 shows a side view of the two-piece lug bolt assembly of FIG. 5.

FIG. 7 shows an end view of the two-piece lug bolt assembly of FIGS. 5 and 6.

FIG. 8 shows a sectioned view of the two-piece lug bolt assembly of FIGS. 5 to 7.

Figure 1:
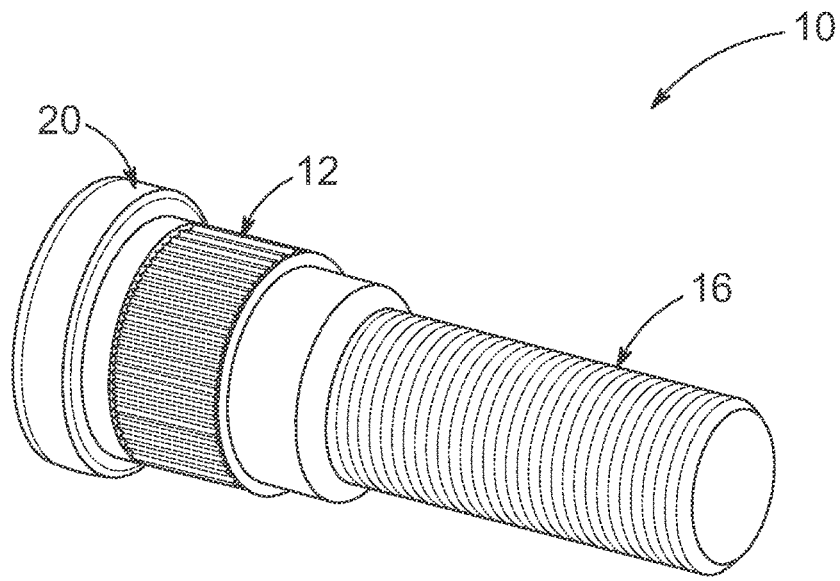
FIG. 1 shows a perspective view of a prior art replacement lug bolt or stud for a motor vehicle wheel.
Figure 2:
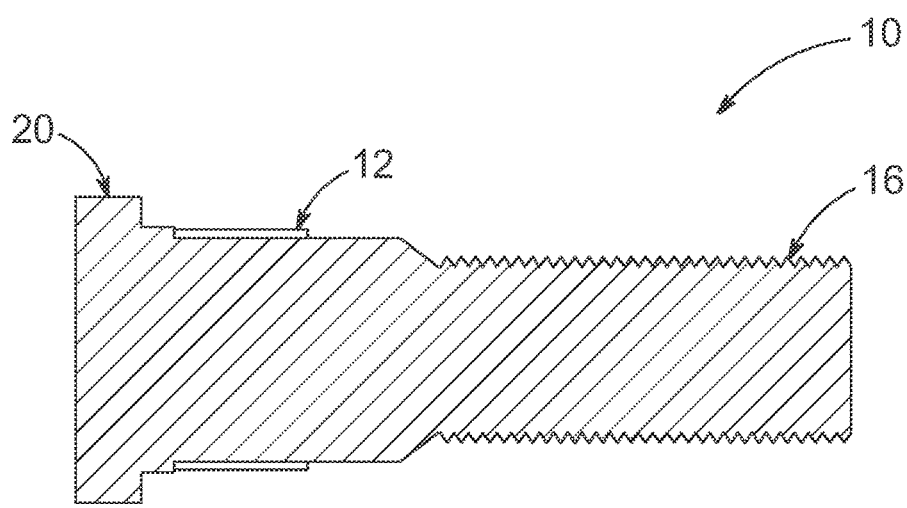
FIG. 2 shows a sectioned view of the prior art replacement lug bolt or stud of FIG. 1.
Figure 3:
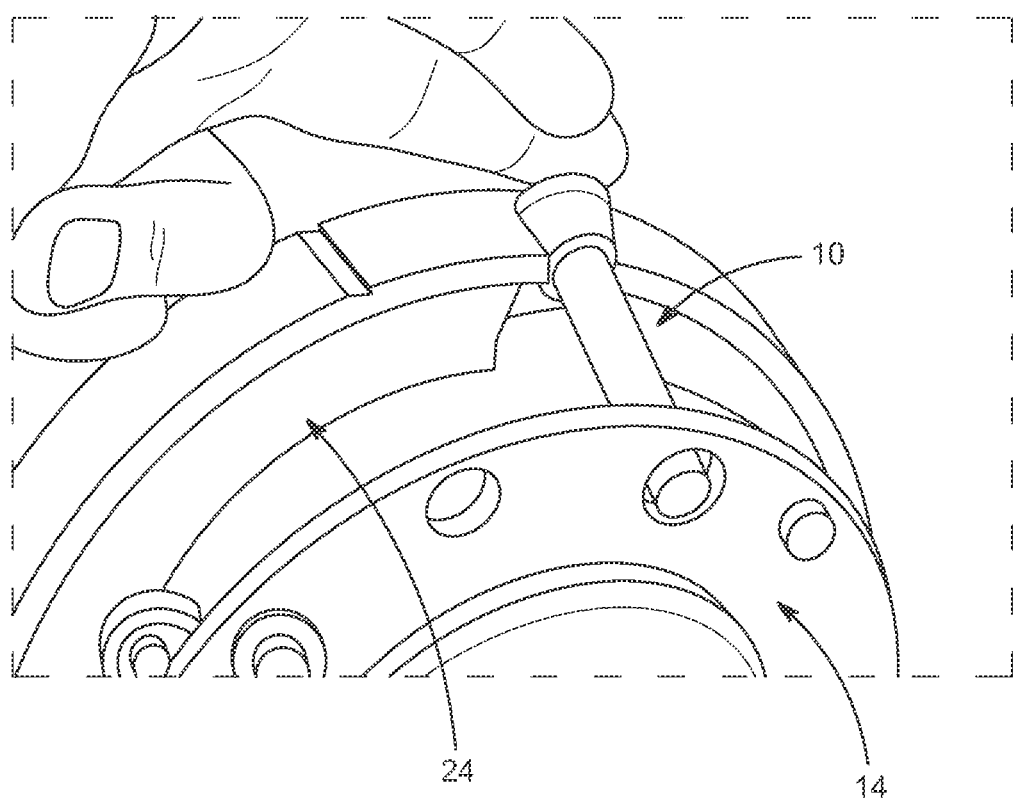
FIG. 3 shows the prior art replacement lug bolt or stud of FIGS. 1 and 2 that is too long for installation into the wheel hub from behind without removing additional components.
Figure 4:
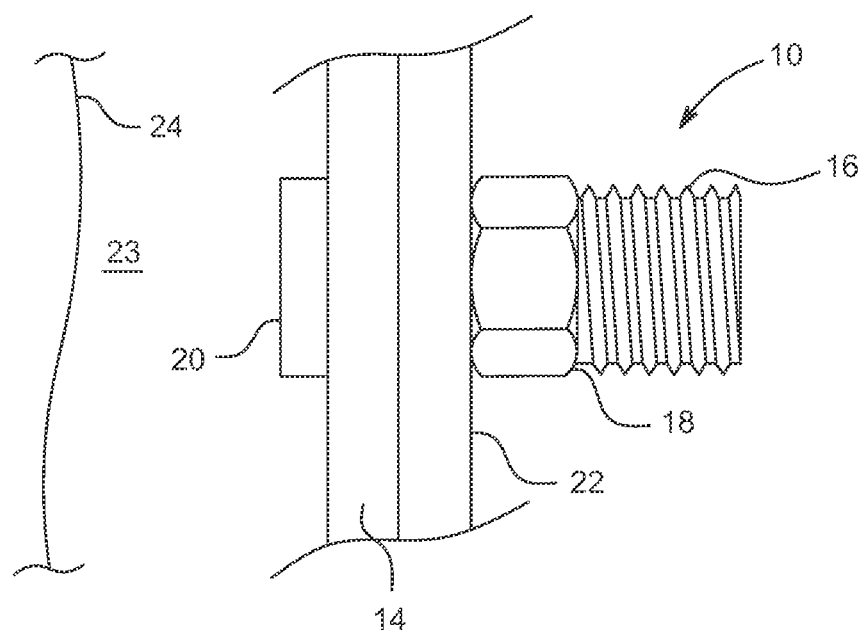
FIG. 4 shows a fragmented view of the prior lug bolt or stud of FIGS. 1 and 2 securing a motor vehicle wheel to the wheel hub of FIG. 3.

It should be understood that the appended drawings are not necessarily to scale, presenting a somewhat simplified representation of various preferred features illustrative of the basic principles of the invention. The specific design features of the various components of the two-piece threaded fastener assemblies as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the components illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the threaded fastener assemblies disclosed herein. The following detailed discussion of various alternative and preferred embodiments will illustrate the general principles of the invention with regard to the specific application of lug bolts for securing motor vehicle wheels. However, other embodiments suitable for other applications will be apparent to those skilled in the art given the benefit of this disclosure.

FIGS. 5 to 8 illustrate a two-piece threaded fastener assembly 30 according to the present invention for use with a internally-threaded nut 18. The illustrated threaded fastener assembly 30 comprises a shaft head or first piece 32 and a separate shaft or second piece 34. The illustrated shaft head 32 includes a head 36 and a collar or fixing segment 38 longitudinally-extending from the head 36. The fixing segment 38 includes a longitudinally-extending internal passage 40 is at least partially internally threaded 42 and open at an outer end of the fixing segment 38 opposite the head 36. The illustrated shaft 34 includes a first externally-threaded portion 44 for cooperation with the internally-threaded portion 42 of the fixing segment 38 to selectively secure the shaft 34 to the shaft head 32, a second externally-threaded portion 46 for cooperation with the internally-threaded nut 18, and an integral nut or wrenching portion 48. The illustrated threaded fastener assembly 30 is configured as a lug bolt for securing, along with the lug nut, 18 a motor vehicle wheel 22 to a wheel hub 14*t*, but it is noted that the threaded fastener assembly 30 can alternatively be configured in any other suitable manner such as, for example, other types of lug bolts, non-lug bolts, and the like.

The illustrated shaft head or first piece 32 includes the fixing segment 38 and the head 36. The illustrated fixing segment 38 is generally cylindrical-shaped and sized to be closely received in the opening in the wheel hub 14. The illustrated head 36 is generally disk-shaped and located at a first or inner end of the fixing segment 38. It is noted that the illustrated head 36 is not provided with a wrenching surface. The fixing segment 38 and the head 36 are each coaxial with a central longitudinal axis 50 of the threaded fastener assembly 30. The head 36 is sized to have an outer diameter larger than the diameter of the hub opening and the fixing section 38. Thus, the head 36 forms an outward facing and annular-shaped abutment 52 that engages the inner side of the wheel hub 14 when the fixing segment 38 is inserted into the opening in the wheel hub 14. The illustrated longitudinally-extending internal passage 40 inwardly extends from a second or outward end of the fixing segment 38. The illustrated internal passage 40 is blind in that it does not extend entirely through the shaft head 32 and thus is only open at the outward end of the fixing segment 38. The illustrated internal passage 40 extends about the entire length of the fixing segment 38 but any other suitable length can alternatively be utilized. The internally-threaded portion 42 of the internal passage 40 is configured to receive and cooperate with the first externally-threaded portion 44 of the shaft 34. A spline 54 is provided on the outer surface of the fixing segment 38 near the head 36 and extends for at least a portion of the outer surface of the fixing segment 38. The illustrated spline 54 has serrations or teeth running parallel to fastener assembly's longitudinal axis 50. The illustrated spline 54 has an outer diameter less than the outer diameter of the head 36 and slightly more that the outer diameter of the opening in the wheel hub 14 so that the fixing section 38 can be pushed or pressed into the wheel hub opening and the spline 54 limits twisting, rotation, and movement of the shaft head 32 within the opening of the wheel hub 14.

The illustrated shaft head 32 is manufactured as a single integral component. The shaft head 32 is preferably formed of steel or stainless steel but can alternatively be formed of any other suitable material. It is noted that the shaft head 32 can alternatively have any other suitable size and/or configuration.

The illustrated shaft or second piece 34 includes the first externally-threaded portion 44 located at an inner or first end of the shaft 34, the integral nut or wrenching portion 48 located at an outer or second end of the shaft 34, and the second externally-threaded portion 46 located between and adjacent to each of the first externally-threaded portion 44 and the wrenching portion 48. Each of the illustrated first externally-threaded portion 44, the second externally-threaded portion 46, and the wrenching portion 48 are generally cylindrical-shaped and concentric with the central longitudinal axis 50 of the threaded fastener assembly 30. The diameter of the illustrated first externally-threaded portion 44 is smaller than the diameter of the illustrated second externally-threaded portion 46 such that an inwardly-facing and annually-shaped abutment 56 is formed at the interface between the first and second externally-threaded portions 44, 46. The diameter of the first externally-threaded portion 44 is sized to cooperate with the internally-threaded portion 42 of the shaft head 32. The diameter of the second externally-threaded portion 46 is sized to cooperate with the nut or lug nut 18. The illustrated wrenching portion 48 has a diameter smaller than the second externally-threaded portion 46 so that the lug nut 18 can be slid over the wrenching portion 48 to the second externally-threaded portion 46. The wrenching portion 48 can take the form of any suitable polygon such as a square, hexagon, or the like in cross section. The wrenching portion 48 is configured so that a wrench or the like can be used to tighten the first external threads 44 of the shaft 34 into the internally-threaded portion 42 of the shaft head 32. When tightening the shaft 34 into the shaft head 32, the inward-facing abutment 56 of the shaft 34 engages the outer end of the shaft head 32 to act as a stop. Additionally, the union between the shaft head 32 and the shaft 34 can be strengthened by using a Loktite thread sealant or the like.

The illustrated shaft 34 is manufactured as a single integral component. The shaft 34 is preferably formed of steel or stainless steel but can alternatively be formed of any other suitable material. It is noted that the shaft 34 can alternatively have any other suitable size and/or configuration.

It should be appreciated that the illustrated threaded fastener assembly 10 described hereinabove can be used in tight spaces 23 because only the shaft head 32 needs to be inserted from behind the wheel hub 14 and the shaft 34 can be secured to the shaft head 32 through the opening in the wheel hub 14 from the outer side of the wheel hub 14. Thus, the illustrated threaded fastener assembly 30 can be easily installed without any modifications to the wheel hub 14 or further disassembly of components 14, 24. It is noted that the threaded fastener assembly 30 can alternatively have any other suitable size and/or configuration.

Figure 9:
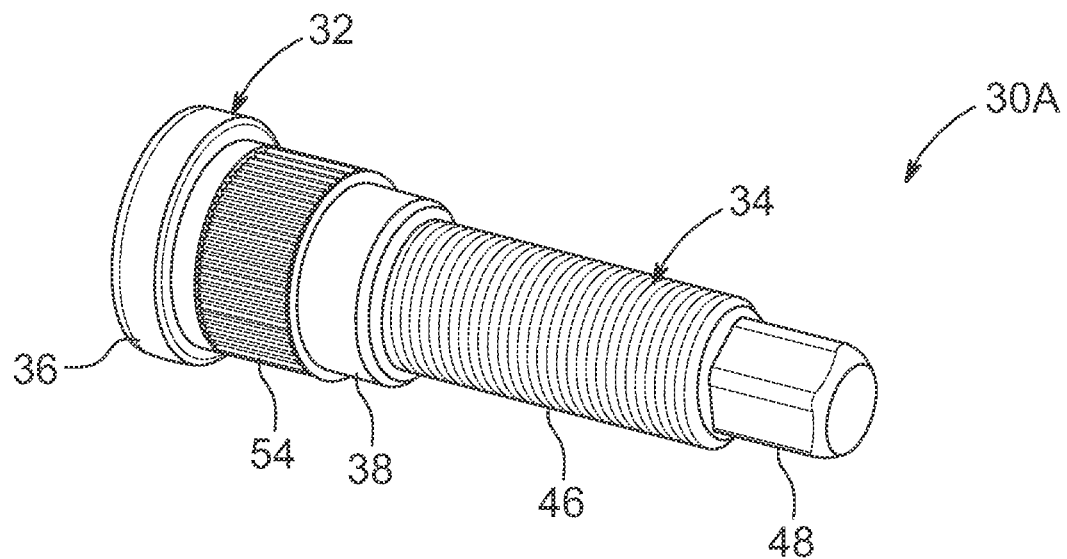
FIG. 9 shows a perspective view of two-piece lug bolt assembly according to a second embodiment of the present invention.
Figure 10:
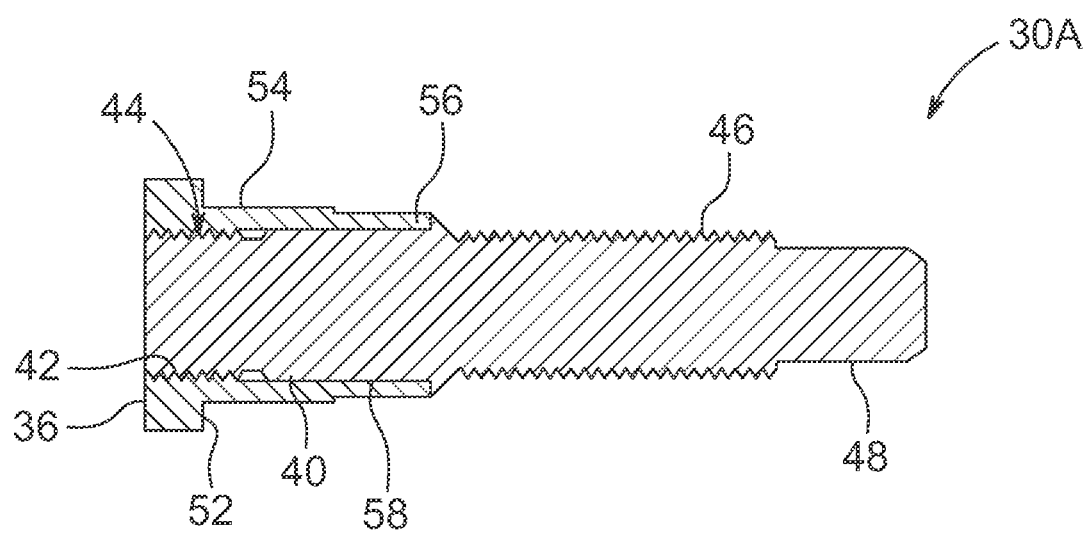
FIG. 10 shows a sectioned view of the two-piece lug bolt assembly of FIG. 9.

FIGS. 9 and 10 illustrate a threaded fastener assembly 30A according to a second embodiment of the present invention. The second embodiment of the present invention is substantially the same as the first embodiment of the invention (shown in FIGS. 5 to 8) except as described hereinbelow. The outer diameter of the first externally-threaded portion 44 of the shaft 34 is the same size as the outer diameter of the second externally-threaded portion 46 of the shaft 34. Additionally, the shaft 34 includes an unthreaded portion 58 of the same diameter as the externally-threaded portions 44, 46 that is located between the first externally-threaded portion 44 and the second externally-threaded portion 46. The illustrated longitudinally-extending internal passage 40 extends entirely through the shaft head 32 and the internal threads 42 are only provided at a portion of the internal passage 40 located adjacent the inner end of the shaft head 32. The portion of the internal passage 40 adjacent the outer end of the shaft head 32 is unthreaded and sized to closely receive the unthreaded portion 58 of the shaft 34. It is noted that the threaded fastener assembly 30A can alternatively have any other suitable size and/or configuration.

Figure 11:
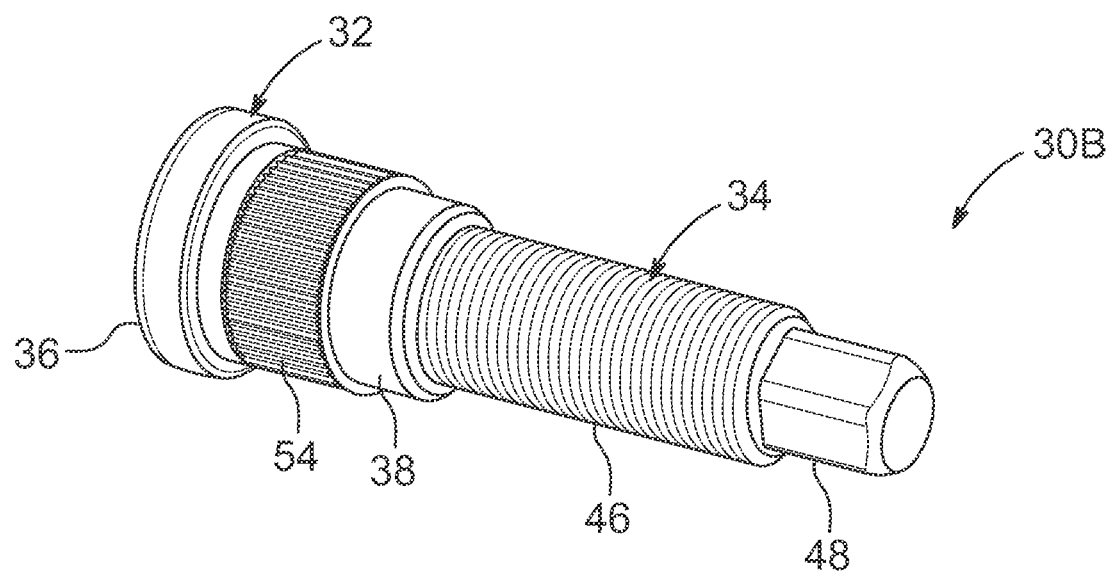
FIG. 11 shows a perspective view of two-piece lug bolt assembly according to a third embodiment of the present invention.
Figure 12:
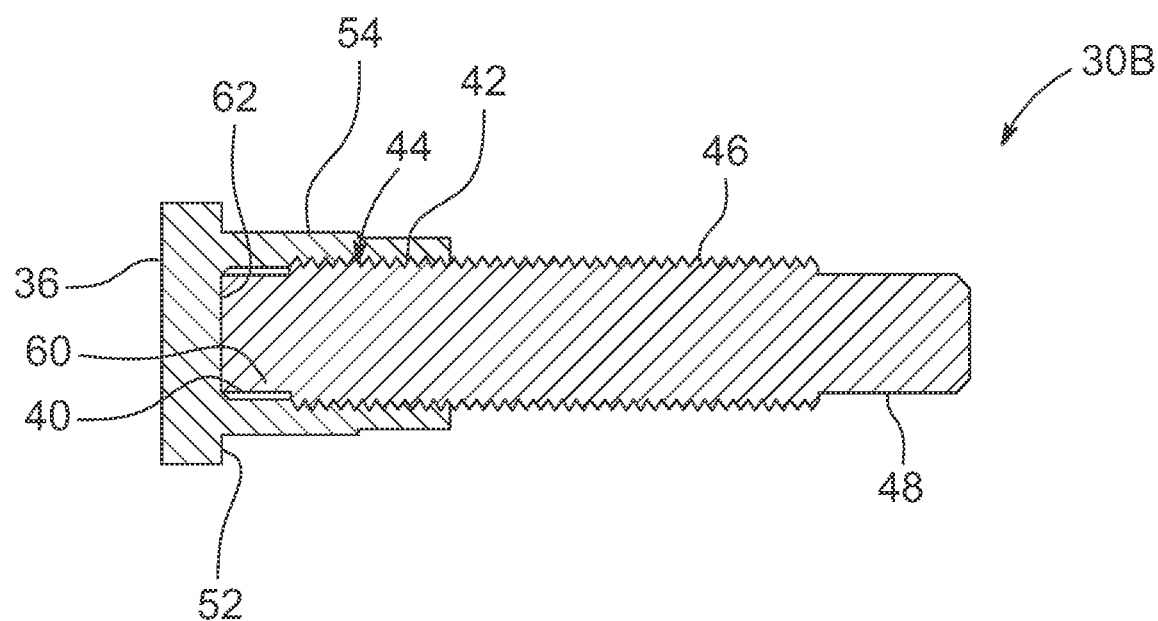
FIG. 12 shows a sectioned view of the two-piece lug bolt assembly of FIG. 11.

FIGS. 11 and 12 illustrate a threaded fastener assembly 30B according to a third embodiment of the present invention. The third embodiment of the present invention is substantially the same as the first embodiment of the invention (shown in FIGS. 5 to 8) except as described hereinbelow. The outer diameter of the first externally-threaded portion 44 of the shaft 34 is the same size as the outer diameter of the second externally-threaded portion 46 of the shaft 34 and they are adjacent one another such that the thread is continuous therebetween. Additionally, the shaft 34 includes an unthreaded portion 60 of a smaller diameter than the externally-threaded portions 44, 46 that is located adjacent the inner end of the shaft 34. The shaft head 32 forms an outwardly-facing abutment 62 within the internal passage 40 at or near the side of the head 36 within the internal passage 40. When tightening the shaft 34 to the shaft head 32, the inward end of the shaft 34 engages the abutment 62 of the shaft head 32 to act as a stop. It is noted that the threaded fastener assembly 30B can alternatively have any other suitable size and/or configuration.

Figure 13:
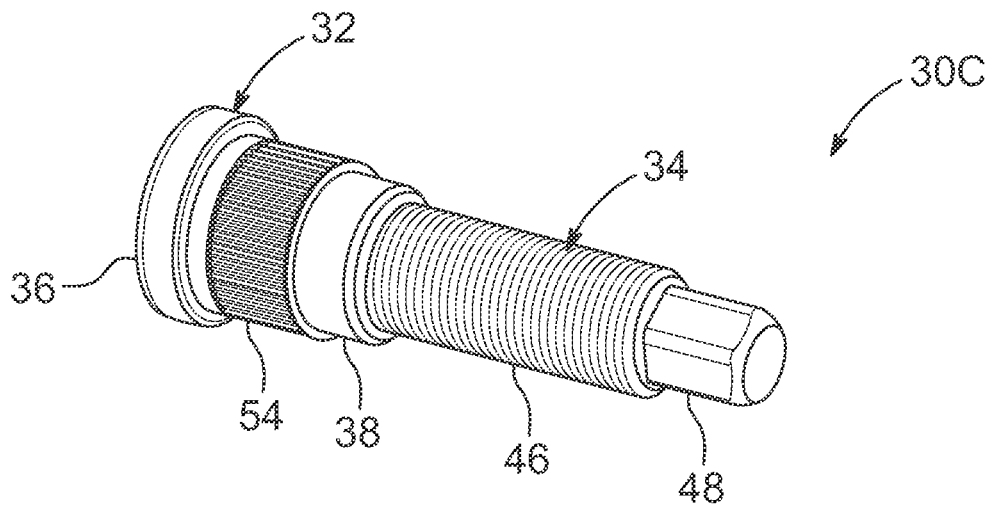
FIG. 13 shows a perspective view of two-piece lug bolt assembly according to a fourth embodiment of the present invention.
Figure 14:
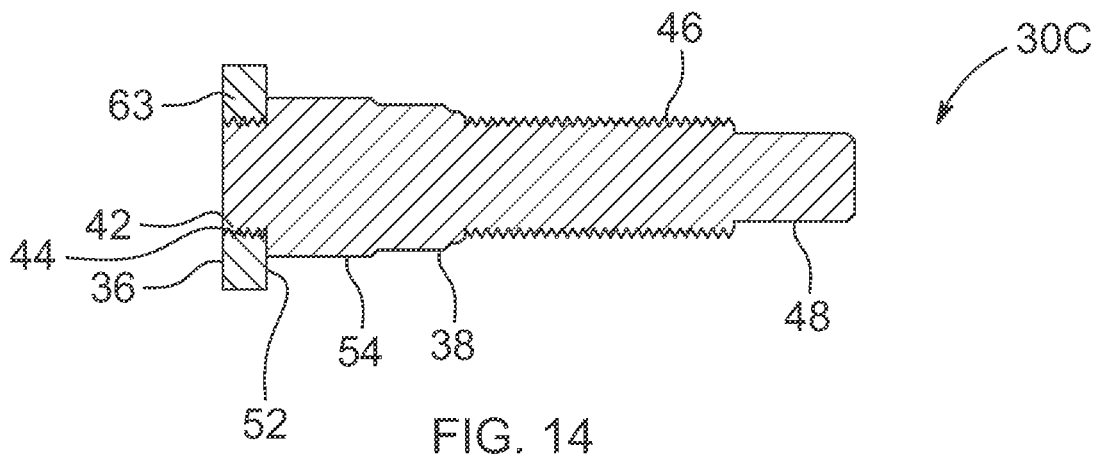
FIG. 14 shows a sectioned view of the two-piece lug bolt assembly of FIG. 13.
Figure 14A:
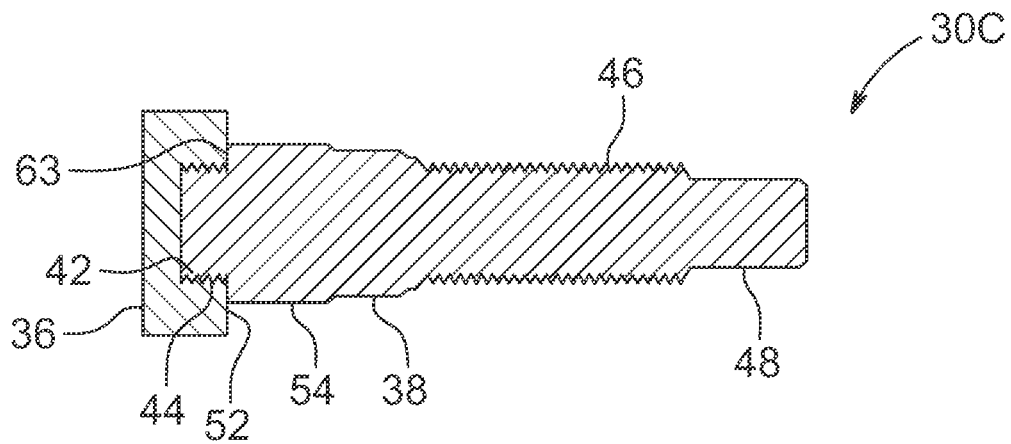
FIG. 14A shows an alternative sectioned view of the two-piece lug bolt assembly of FIG. 13.

FIGS. 13, 14 and 14A illustrate a threaded fastener assembly 30C according to a fourth embodiment of the present invention. The fourth embodiment of the present invention is substantially the same as the second embodiment of the invention (shown in FIGS. 9 and 10) except as described hereinbelow. The collar or fixing segment 38 is formed as part of the shaft 34 rather than part of the shaft head 32. The collar or fixing segment 38 is located between the first externally-threaded portion 44 and the second-externally threaded portion 46 of the shaft 34. The outer diameter of the first externally-threaded portion 44 of the shaft 34 is smaller in size than the outer diameter of the second externally-threaded portion 46 of the shaft 34. The outer diameter of the first externally-threaded portion 44 of the shaft 34 is also smaller in size than the outer diameter of the fixing segment to form the inward facing abutment 63. The illustrated shaft head 32 includes only the head 36. The internally-threaded portion 42 can extend entirely through the head 36 as shown in FIG. 14. Alternatively, the internally-threaded portion 42 can be provided in a blind bore so that the internally-threaded portion 42 extends only partially through the head 36 as shown in FIG. 14A. The outer diameter of the head 36 is increased in size in order to provide increased engagement with the wheel hub 14. The head 36 can be provided with a wrenching surface if desired in order to more easily start the threaded connection between the shaft head 32 and the shaft upon installation. A suitable wrenching surface is shown as item 55 in FIG. 17. It is noted that the threaded fastener assembly 30C can alternatively have any other suitable size and/or configuration.

Figure 15:
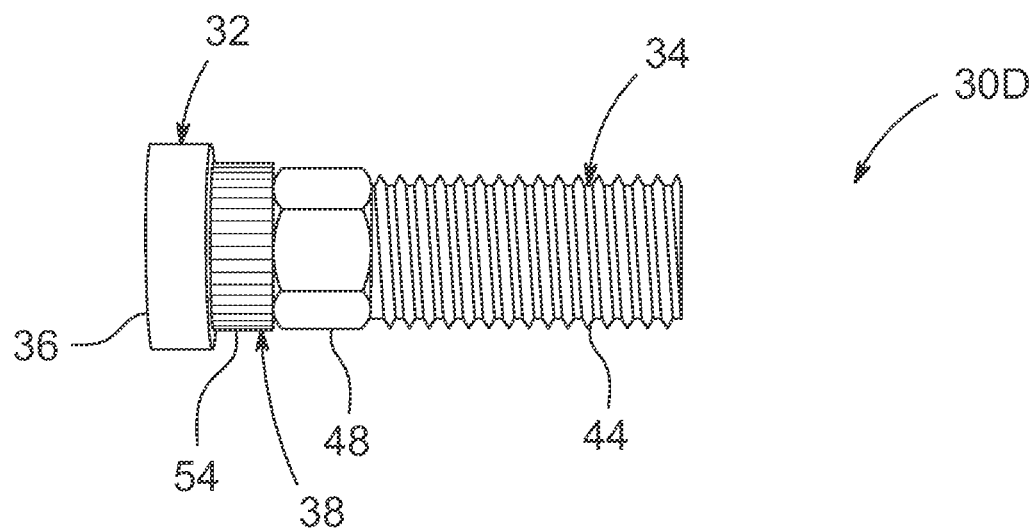
FIG. 15 shows a perspective view of two-piece lug bolt assembly according to a fifth embodiment of the present invention.
Figure 16:
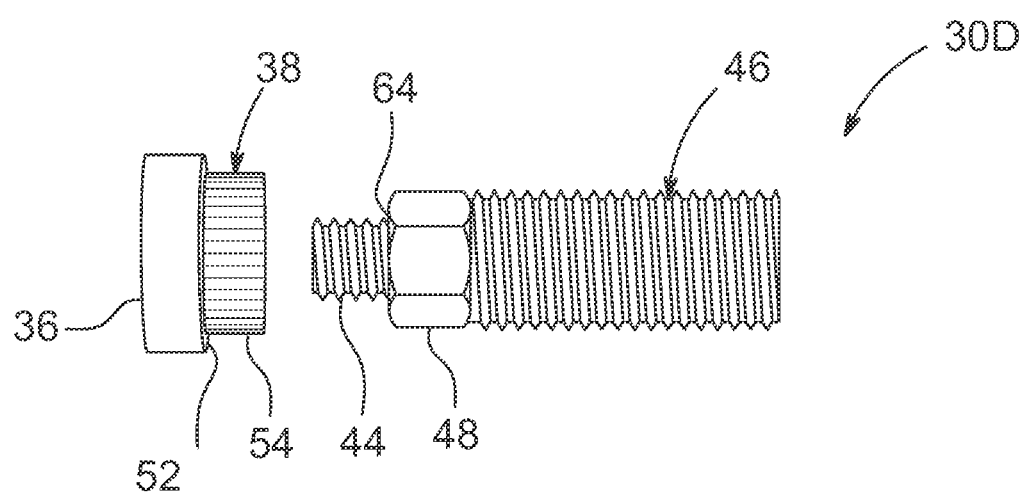
FIG. 16 shows an exploded view of the two-piece lug bolt assembly of FIG. 15.

FIGS. 15 and 16 illustrate a threaded fastener assembly 30D according to a fifth embodiment of the present invention. The fifth embodiment of the present invention is substantially the same as the first embodiment of the invention (shown in FIGS. 5 to 8) except as described hereinbelow. The wrenching portion 48 of the shaft 34 is located between the first and second externally-threaded portions 44, 46 rather than at the outer end of the shaft 34. The wrenching portion 48 also has a diameter generally equal to the second externally-threaded portion 46 and larger than the first externally-threaded portion 44 to form the inward facing abutment 64 rather than the second externally-threaded portion 46. It is noted that the threaded fastener assembly 30D can alternatively have any other suitable size and/or configuration.

Figure 17:
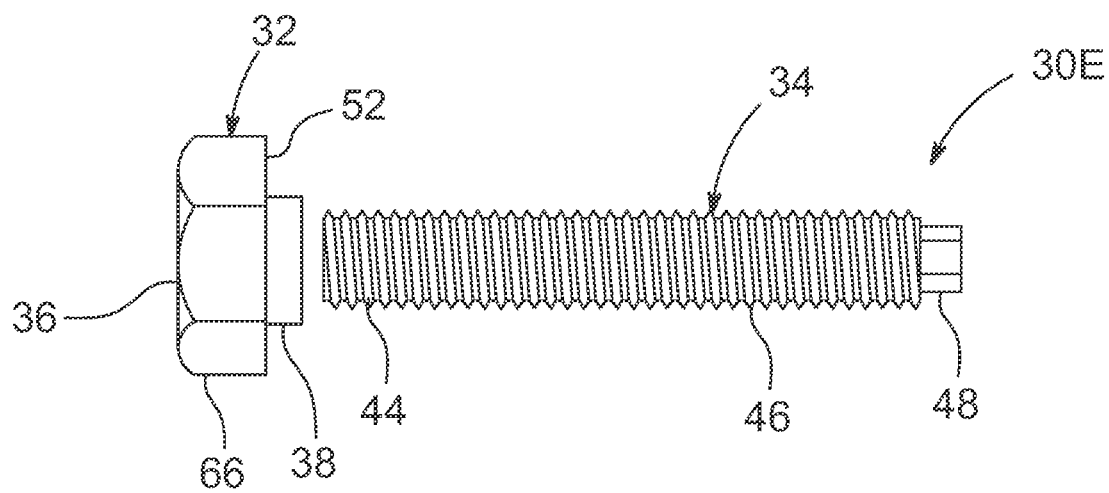
FIG. 17 shows a perspective view of two-piece hex bolt assembly according to a sixth embodiment of the present invention.

FIG. 17 illustrates a threaded fastener assembly according 30E to a sixth embodiment of the present invention. The sixth embodiment of the present invention is substantially the same as the first embodiment of the invention (FIGS. 5 to 8) except as described hereinbelow. The illustrated threaded fastener assembly 30E is configured as a non-lug bolt. More specifically it is configured as a hex bolt. However, it is noted that this non-lug bolt can alternatively be of any other suitable type such as, for example, carriage bolts, flange bolts, plow bolts, square head bolts, elevator bolts, tension bolts, etc. The shaft head 32 is provided with a wrenching surface 66. The wrenching surface 66 can take the form of any suitable polygon such as a square, hexagon, or the like in cross section. The illustrated hex bolt has a hexagon-shaped wrenching surface 66. The shaft head 32 also does not have a spline 54. The outer diameter of the first externally-threaded portion 44 of the shaft 34 is the same size as the outer diameter of the second externally-threaded portion 46 of the shaft 34 and they are adjacent one another such that the thread is continuous therebetween. It is noted that the threaded fastener assembly 30E can alternatively have any other suitable size and/or configuration.

It is noted that each of the features of the various disclosed embodiments of the present invention can be utilized in any combination with each of the other disclosed embodiments of the present invention.

From the above disclosure it can be appreciated that the threaded fastener assemblies according to the present invention provide threaded fasteners that can be installed when there is limited space on at least one side for insertion of the fastener. Additionally, the threaded fastener assemblies according to the present invention can be provided at a relatively low cost.

The embodiments of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention.

What is claimed is:

1. A threaded fastener assembly for use with a nut, said threaded fastener assembly comprising, in combination:
    a shaft head including a head, and a longitudinally-extending internal passage that includes an internally-threaded portion;
    a shaft separate from the shaft head and including a first externally-threaded portion for cooperation with the internally-threaded portion of the shaft head for selectively securing at least a portion of the first externally-threaded portion of the shaft within the internally-threaded portion of the shaft head, and a second externally-threaded portion for cooperation with the nut;
    wherein the shaft includes an integrated wrenching portion for tightening the first externally-threaded portion of the shaft within the internally-threaded portion of the shaft head; and
    further wherein the shaft includes an inward-facing abutment configured to engage an outwardly-facing abutment of the shaft head when at least a portion the first externally-threaded portion is tightened within the internally-threaded portion of the shaft head.

2. The threaded fastener assembly according to claim 1, wherein the wrenching portion is located at an end of the shaft opposite the first externally-threaded portion of the shaft.

3. The threaded fastener assembly according to claim 1, wherein the wrenching portion is located between the first externally-threaded portion of the shaft and the second externally-threaded portion of the shaft.

4. The threaded fastener assembly according to claim 1, wherein the shaft head further includes a fixing segment extending from the head, and a plurality of splines on an external surface of the fixing segment, and wherein the internally-threaded portion is at least partially within the fixing segment.

5. The threaded fastener assembly according to claim 1, wherein the shaft further includes a fixing segment located between the first externally-threaded portion and the second externally-threaded portion, and a plurality of splines on an external surface of the fixing segment, and wherein the internally-threaded portion is entirely within the head.

6. The threaded fastener assembly according to claim 1, wherein the shaft head and the shaft are configured as a lug bolt.

7. The threaded fastener assembly according to claim 1, wherein the second externally-threaded portion of the shaft has a diameter larger than the first externally-threaded portion of the shaft such that said inward facing abutment is provided between the second externally-threaded portion and the first externally-threaded portion, and said outwardly-facing abutment of the shaft head comprises an outer end of the shaft head.

8. The threaded fastener assembly according to claim 1, wherein said inward facing abutment is located between the second externally-threaded portion and the first externally-threaded portion and said outwardly-facing abutment of the shaft head comprises an outer end of the shaft head.

9. The threaded fastener assembly according to claim 1, wherein the second externally-threaded portion of the shaft has a diameter the same size as the first externally-threaded portion of the shaft.

10. The threaded fastener assembly according to claim 9, wherein the first externally-threaded portion and the second externally-threaded portion are continuous.

11. The threaded fastener assembly according to claim 1, wherein the first externally-threaded portion and the second externally-threaded portion are spaced-apart and said inward-facing abutment is located between the second externally-threaded portion and the first externally-threaded portion.

12. The threaded fastener assembly according to claim 11, wherein the longitudinally-extending internal passage extends entirely through the shaft head.

13. The threaded fastener assembly according to claim 1, wherein the fastener assembly has a longitudinal axis, and further comprising a plurality of splines extending parallel to the longitudinal axis of the fastener assembly on an outer surface of either the shaft head or the shaft.

14. The threaded lug bolt assembly of claim 13, wherein the shaft head further comprises a collar extending longitudinally away from the head, with said plurality of splines extending along a portion of an outer surface of the collar, said longitudinally-extending internal passage extending through said collar, wherein a portion of said longitudinally-extending internal passage is unthreaded, and said outwardly-facing abutment comprises an outer end of the collar.

15. A threaded fastener assembly for use with a nut, said threaded fastener assembly comprising, in combination:
a shaft head including a head, a fixing segment extending from the head, and a longitudinally-extending internal passage within the fixing segment, wherein the longitudinally-extending internal passage includes an internally-threaded portion wherein the longitudinally-extending internal passage is blind and does not extend entirely through the shaft head;
wherein the shaft head includes a plurality of splines on an external surface of the fixing segment; and
a shaft separate from the shaft head and including a first externally-threaded portion for cooperation with the internally-threaded portion of the shaft head for selectively securing the shaft to the shaft head, a second externally-threaded portion for cooperation with the nut, and an integrated wrenching portion for tightening the first externally-threaded portion of the shaft within the internally-threaded portion of the shaft head.

16. The threaded fastener assembly according to claim 15, wherein the second externally-threaded portion of the shaft has a diameter larger than the first externally-threaded portion of the shaft, and an inward facing abutment is formed between the second externally-threaded portion and the first externally-threaded portion and configured to engage an outer end of the shaft head opposite the head when at least a portion the first externally-threaded portion is tightened within the internally-threaded portion of the shaft head.

17. The threaded fastener assembly according to claim 15, wherein the second externally-threaded portion of the shaft has a diameter the same size as the first externally-threaded portion of the shaft.

18. The threaded fastener assembly according to claim 17, wherein the first externally-threaded portion and the second externally-threaded portion are spaced-apart and an inward-facing abutment is formed between the second externally-threaded portion and the first externally-threaded portion, wherein the inward-facing abutment is configured to engage an outer end of the shaft head opposite the head when at least a portion the first externally-threaded portion is tightened within the internally-threaded portion of the shaft head.

19. The threaded fastener assembly according to claim 15, wherein the first externally-threaded portion and the second externally-threaded portion are continuous.

20. A threaded fastener assembly for use with a nut, said threaded fastener assembly comprising, in combination:
a shaft head including a head, and a fixing segment extending from the head, wherein at least a portion of the fixing segment includes an internally-threaded portion;
wherein the shaft head includes a plurality of splines on an external surface of the fixing segment;
a shaft separate from the shaft head and including a first externally-threaded portion for cooperation with the internally-threaded portion of the shaft head for selectively securing the shaft to the shaft head, a second externally-threaded portion for cooperation with the nut, and an integrated wrenching portion for tightening the first externally-threaded portion of the shaft within the internally-threaded portion of the shaft head;
wherein the first externally-threaded portion and the second externally-threaded portion of the shaft are continuous; and
wherein an inner end of the shaft engages an abutment formed within the shaft head.

* * * * *